United States Patent [19]
Trowbridge

[11] Patent Number: 5,931,234
[45] Date of Patent: Aug. 3, 1999

[54] MULTI-PURPOSE RETRACTABLE TRACTOR TOOLBAR DEVICE

[76] Inventor: Larry Gene Trowbridge, 2000 Thigpen Trail, Hartsfield, Ga. 31756

[21] Appl. No.: 08/734,750

[22] Filed: Oct. 21, 1996

[51] Int. Cl.⁶ .................................................. A01B 59/043
[52] U.S. Cl. ........................... 172/446; 172/448; 172/449; 172/451
[58] Field of Search ..................... 172/677, 679, 172/446, 447, 448, 449, 451, 272, 273; 280/472; 56/56, 58, 63, 59; 171/46, 47, 48

[56] References Cited

U.S. PATENT DOCUMENTS

| | | | |
|---|---|---|---|
| 3,001,590 | 9/1961 | Tsuchiya | 172/451 |
| 3,232,358 | 2/1966 | Heiberg | 172/677 X |
| 3,275,341 | 9/1966 | Ralston | 172/451 |
| 3,810,660 | 5/1974 | Peterson | 172/272 |
| 4,047,366 | 9/1977 | Balthes et al. | 56/63 |
| 4,060,254 | 11/1977 | Ernst | 172/446 |
| 4,128,131 | 12/1978 | Bucher et al. | 172/451 X |
| 4,155,408 | 5/1979 | Welborn | 172/611 X |
| 4,262,921 | 4/1981 | Dwyer | 172/679 |
| 4,579,179 | 4/1986 | Vachon | 172/776 X |
| 4,579,361 | 4/1986 | Lowe et al. | 172/677 |

*Primary Examiner*—Thomas B. Will
*Assistant Examiner*—Victor Batson
*Attorney, Agent, or Firm*—Carnes Conaz Dixon

[57] ABSTRACT

The present invention is a multi-purpose tractor toolbar device which is designed to be attached to a conventional tractor. The toolbar includes a first frame section and a second frame section. The first frame section is slideably mounted to the second frame section via a sliding mechanism. The second frame section is removably secured to the conventional tractor. The sliding mechanism enables the first frame section to travel transversely along the tractor and optionally can be retracted so as to enable the first frame section to be situated rearwardly and centrally behind the tractor. The first frame section is designed to accept and maintain a plurality of conventional farming implements, such as toppers, sprayers or the like. The multi-purpose tractor toolbar device is also equipped with a hydraulic cylinder for enabling angular movement of the first frame section. The attachment of the toolbar device of the present invention to the conventional tractor occurs via a conventional three point hitch. The use of such an attachment provides for a lifting mechanism for enabling raising and lowering of the device.

20 Claims, 4 Drawing Sheets

MULTI-PURPOSE RETRACTABLE TRACTOR TOOLBAR DEVICE

BACKGROUND OF THE INVENTION

1. Field of the Invention

The present invention relates generally to a multi-purpose tractor toolbar device and more particularly to a multi-purpose tractor toolbar device which is adapted to be removably secured to a conventional tractor to allow conventional farming implements to be secured thereto and to render the conventional implements to travel transversely from the conventional tractor as well as travel efficiently across the top of several rows of crops for enabling activity to occur above the crops. The conventional farming implements, such as toppers, sprayers or the like will provide activities such as removing the blooms or sucker from tobacco plants, fertilizing the harvest, or the like. The multi-purpose tractor toolbar device is equipped with a sliding means which enables transverse movement, a tilting means for enabling angular movement, and a lifting means for enabling raising and lowering of the device. The sliding means will provide for the toolbar device to be transversely adjusted to the desired row(s) or can also be relocated behind the tractor to provide for the toolbar to be located centrally and rearwardly with respect to the tractor for rendering a more compact unit which will provide an easy means for transporting the implement from field to field, from field to barn, or the like.

2. Description of the Prior Art

Tobacco plants have a very weak rooting system. During the course of harvesting tobacco, the plants will grow blooms. These blooms, which grow on the plants, are generally large, bulky and heavy. Due to the structure, configuration, and weight of the blooms, the plant can easily tip over during gusty weather or optionally can retain water during a rain storm and eventually tip over due to the excess weight of the combined flower and fluid retention. The overthrown plant may eventually die and sufficiently decrease the harvest yield. Accordingly, it is desirable to remove the plurality of blooms which grow on a mature plant, commonly referred to as topping the plant. By removing the blooms or topping the plant, the crop is able to thrive and inherently maximize the yield from the harvest.

In the past and still today, some farmers will manually remove the blooms. This process is not only tedious, but is extremely time consuming as well as economically inefficient, due to time required to remove each bloom in addition to the cost of labor. Accordingly, implement devices have been developed to aid and assist in this process of removing the blooms or topping plants. These implement devices are known as toppers. The conventional toppers are typically placed on a toolbar. These toolbars are typically adapted to be removably secured to the back of a tractor.

A toolbar adapted to maintain a pair of toppers is disclosed in U.S. Pat. No. 4,047,366 issued to Balthes et al. In this patent there is disclosed a toolbar frontwardly mounted on a conventional tractor device. This disclosed toolbar maintains conventional toppers. Though this device discloses a means of maintaining more than one topper, this device fails to discloses a means of transversely relocating the toppers. Failure to disclose a retractor toolbar provides a device which is burdensome to use and which will not efficiently harvest a crop.

Accordingly, there is a need for a toolbar device which can successfully travel across the top of plants by providing a toolbar which is adapted to travel transversely along the side of a tractor. As seen, none of these previous efforts provide the benefits intended with the present invention, such as providing a toolbar which will allow for multi-directional movement of conventional farming implement devices, such as toppers, sprayers or the like, for inherently allowing easy and efficient removal of the top of a plant, such as a flower from a tobacco plant, as well as enable the same implement to be used for dispensing a fluid, such as fertilizer, water, or an insecticide. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a multi-purpose tractor toolbar device which is adapted to be removably secured to a conventional tractor utilizing the three point hitch. This implement device of the present invention is designed and configured to travel transversely from the tractor and over at least two rows of crops for allowing an apparatus which will cover a larger surface area. In particular, the device has been successfully employed to expand up to four rows of crop, each row being up to 48 inches in width.

For transverse transportation, the present invention comprises a toolbar having two frame sections. The first frame section is coupled to the tractor via the second frame section of the tool bar. This first frame section is designed to extend across at least two rows of crops and can maintain a plurality of conventional farming implement devices, such as toppers or sprayers. Enabling a wide selection of implements to be attached to the first section provides an apparatus which is versatile as well as efficient.

Enabling transportation from field to field, the first frame section includes a sliding means for enabling the implements attached to the first frame section to slide and retract transversely. This transverse movement will allow for the implements to be located either perpendicularly with respect to the tractor or rearwardly and centrally with respect to the tractor.

When the first frame section is in the position such that it is located rearwardly and centrally behind the conventional tractor, easy transportation of the conventional farm implements, such as from field to field or from field to barn, can be achieved with minimal or no difficulties.

The first frame section further includes a means of adjusting and leveling the farm implements (toppers, sprayers, etc.) to a desired location. Thereby, providing for the farm implements to be tilted and pivoted to the desired angle.

The second frame section includes an accommodating means for enabling the toolbar device of the present invention to be raised or lowered to a desired position.

This second frame section is attached to the first frame section and includes a means of attaching to a conventional tractor. This means of attaching is the use of the conventional three point. The second frame portion supports the first frame portion and also counter balances the first frame section.

Accordingly, it is the object of the present invention to provide for a multi-purpose tractor toolbar device which will overcome the deficiencies, shortcomings, and drawbacks of prior toolbar devices and methods thereof.

Still another object of the present invention is to provide for a multi-purpose tractor toolbar device which is easy to use and maneuver as well as provide an implement device which offers the user several options and utility.

Yet another object of the present invention is to provide for a multi-purpose tractor toolbar device which will successfully maintain conventional farm implement devices so as to provide for a versatile device which can be used to maintain toppers for enabling the removal of tops from plants and which will also enable other implements, such as sprayers, to be removably secured thereto. The use of sprayers not only broadens the utility of the multi-purpose tractor toolbar device by enabling direct central spraying over the desired row but will inherently prevent waste of chemicals and the like. This precise spraying capabilities will save on chemical usage, the environment and excess costs.

Still a further object of the present invention, to be specifically enumerated herein, is to provide a multi-purpose tractor toolbar device in accordance with the preceding objects and which will conform to conventional forms of manufacture, be of simple construction and easy to use so as to provide a device that would be economically feasible, long lasting and relatively trouble free in operation.

Although there have been many inventions related to toolbar devices, none of the inventions have become sufficiently compact, low cost, reliable enough to become commonly used, and enable expansion over a plurality of rows of crops. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

As seen in the various views of the drawings the multi-purpose tractor toolbar device 10 of the present invention includes a first frame section 12 attached to a second frame section 14. The second frame section is adapted to be removably secured to a conventional tractor via the conventional three point hitch.

Figure 1A:
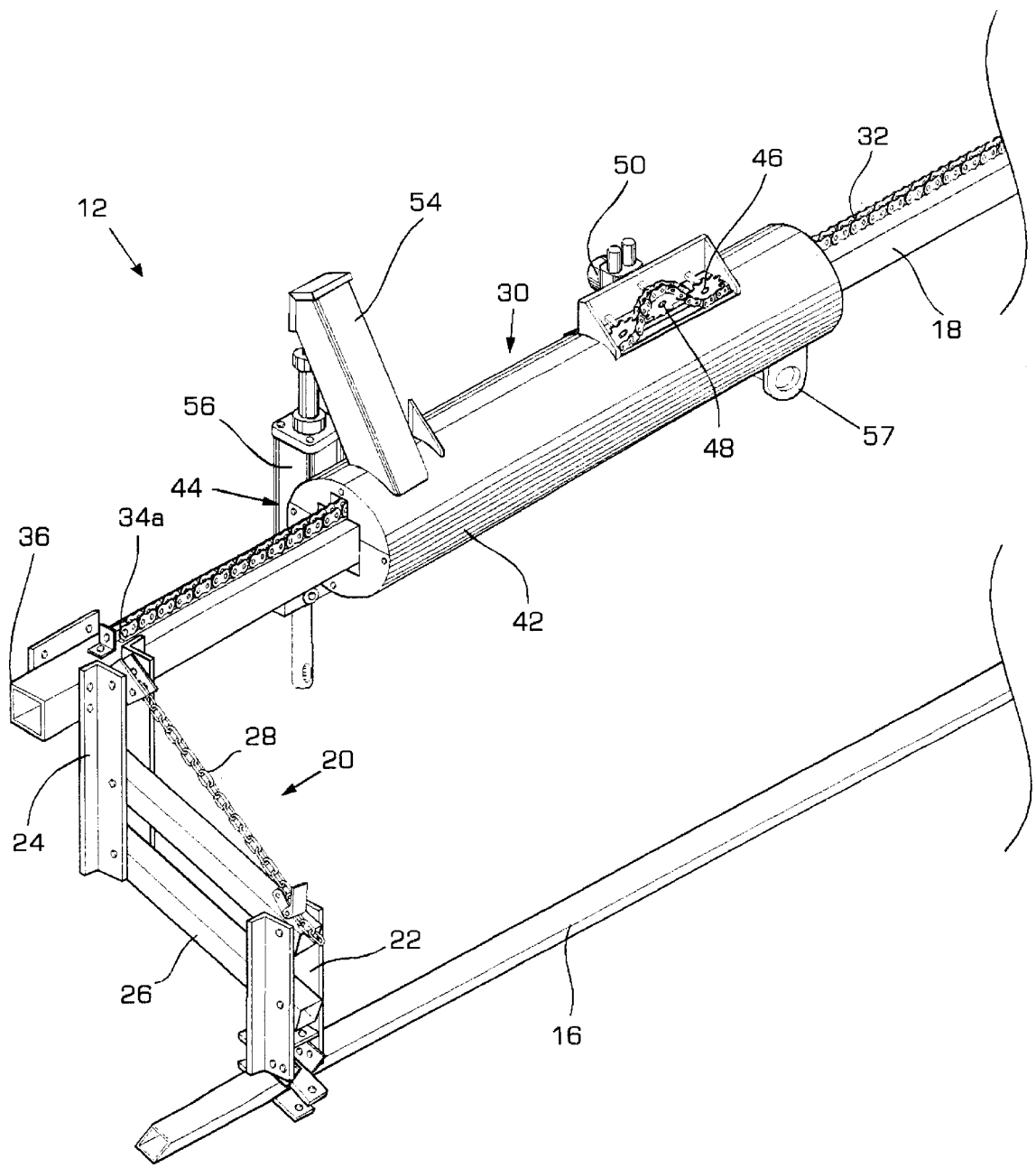
FIG. 1a is a perspective view of the first side of the first frame section of the multi-purpose tractor toolbar device of the present invention.
Figure 1B:
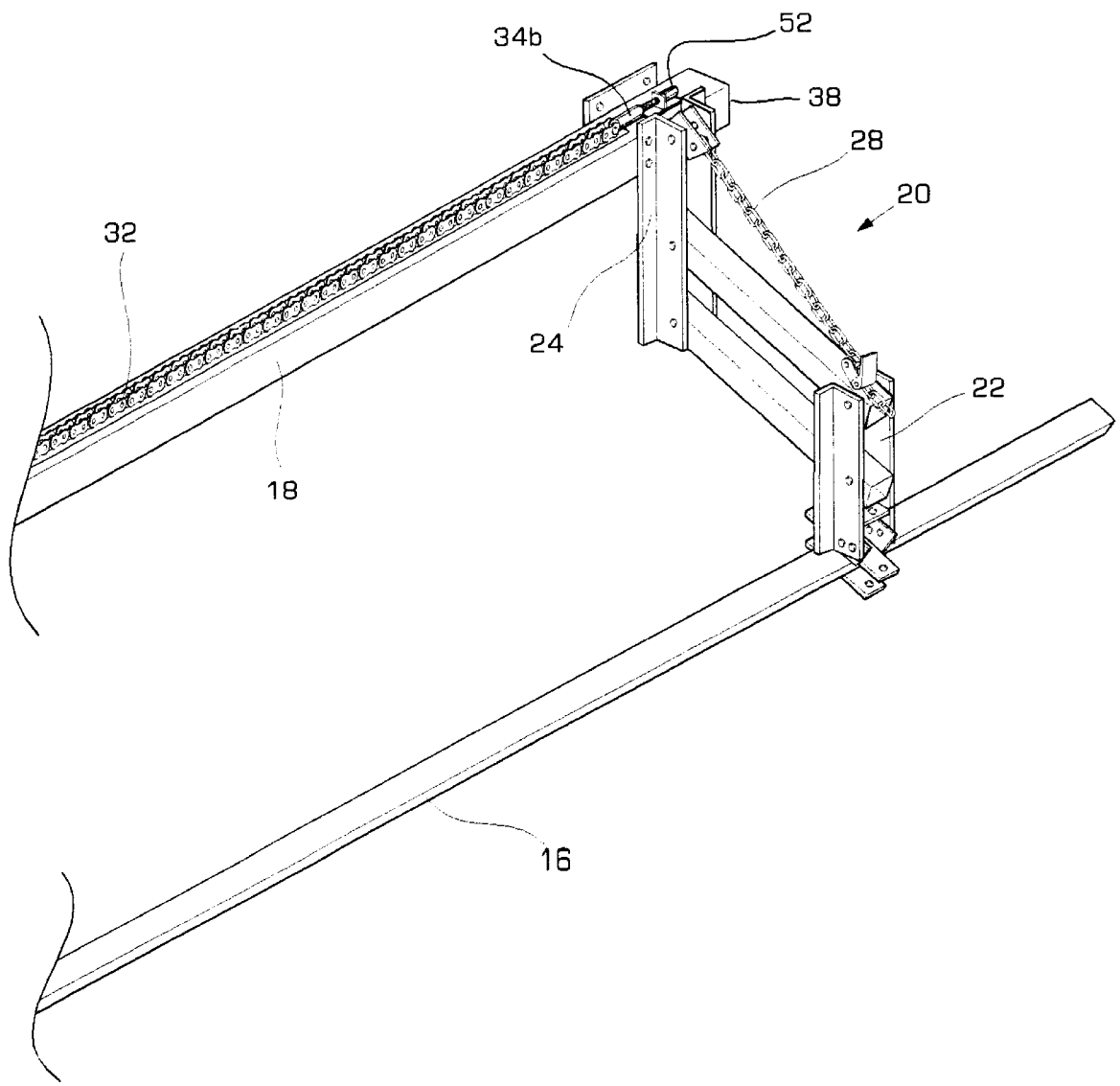
FIG. 1b is a perspective view of the second side of the first frame section of the multi-purpose tractor toolbar device of the present invention.
Figure 3:
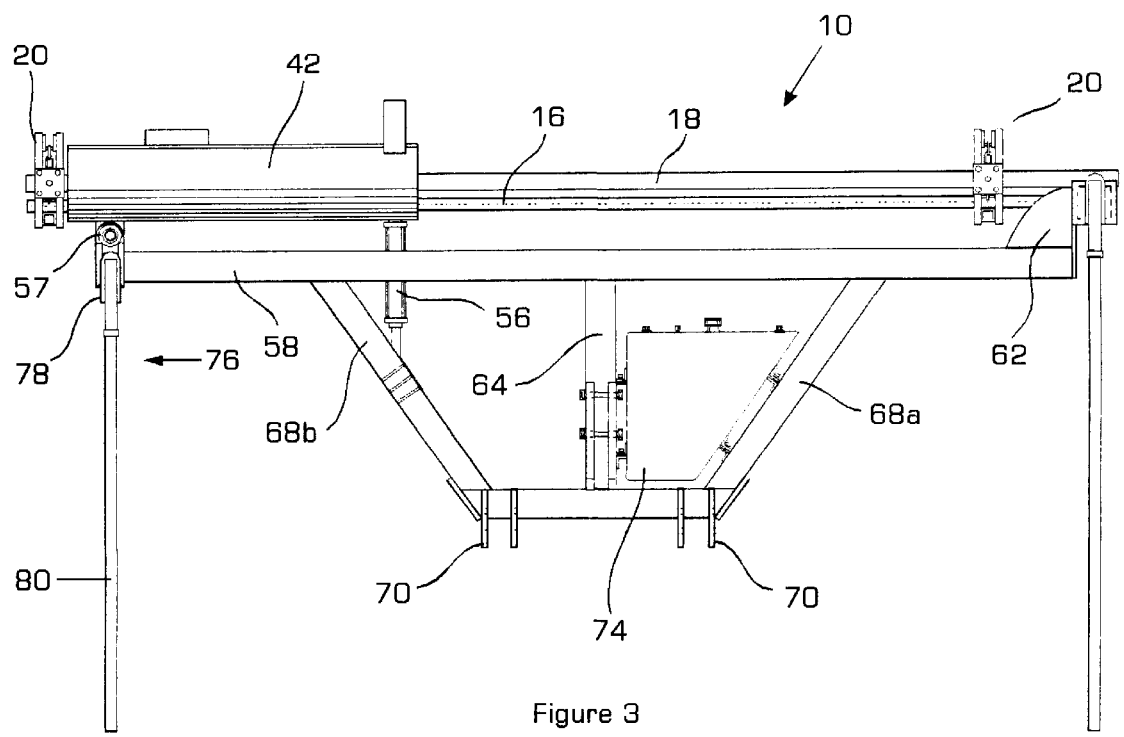
FIG. 3 is a front planar view illustrating the attachment of the first frame section to the second frame section of the multi-purpose tractor toolbar device of the present invention.

The first frame section 12 is illustrated in further detail in FIGS. 1a, 1b, and 3. As seen, this first frame section 12 includes a first support member 16 and a second support member 18 located parallel to the first support member 16. The first support member 16 is located on a different and lower plane than the second member 18. The conventional farmer implement devices (such as a sprayer or topper) are attached to this first support member 16.

The first support member 16 is coupled to the second support member 18 via a linkage means 20. The linkage means acts as an equalizer between the first support member 16 and second support member 18.

As seen in the drawings, the linkage means comprises a first set of brackets 22 which are perpendicularly secured at opposite ends of the first support member 16. These first set of brackets 22 extend upwardly from the first support member. A second set of brackets 24 are perpendicularly secured at the opposite end of the second support member 18. This second set of brackets 24 extend downwardly from the second support member 18. Coupling bars 26 extend from the first set of brackets 22 to the second set of brackets 24 to provide for the first support member 16 to be coupled to the second support member 18. The structure and configuration of the brackets provides for the second support member 18 to be located above, yet parallel, to the first support member 16. For further support for the linkage means 20, support chains 28 are used. These support chains 28 extend from the upper end of the first set of brackets 22 to the second set of brackets 24. The combination of the brackets 22 and 24, respectively, and the support chains 28 provides for a linkage means 20 which will sustain the first support member 16 below and parallel to the second support member 18.

For conservation of material, the coupling bars can be reduced to a single bar. The first set of brackets can also be eliminated for providing for the coupling bar(s) to be directly attached to first support member. Further still, the first set of brackets do not necessarily need to be attached perpendicularly to the first support member. The object of the linkage means is to merely attached the first support member to the second support member for providing for the first support member to be situated lower than the second support member.

Secured to the second frame member 18 is the sliding means 30. The sliding means includes a chain 32 having opposite ends 34a and 34b. This chain is situated within a channel or guide. This channel or guide is located within the second frame member. The chain extends horizontally across the second frame member for providing for the first end 34a of the chain 32 to be secured to a first end 36 of the second support member 18 and the second end 34b is secured to the second end 38 of the second support member. This first end 36 and second end 38 are located in proximity to the linkage means 20.

A housing 42, having opened opposite ends, surrounds the second support member 18 to provide for the second support member 18 to be slidably mounted within the housing 42. The housing is shown to be cylindrical in configuration, but it is noted that any shape can be provided for this housing.

This housing 42, preferably, and as illustrated, only partially covers the second support member 18. The housing 42 is secured to the second frame section 14 via a connecting means 44.

Located and rotatably secured within the housing are a pair of retractable chain sprockets 46. A motor sprocket 48 is situated between the pair of retractor chain sprockets 46. This motor sprocket 48 is secured to a conventional retractable motor 50 which is located and affixed exteriorly on the housing 42. The motor sprocket 48 and chain sprockets 46 include teeth that are designed to catch and engage the links of the chain 32. Thereby, this will provide for the chain 32 to travel within the housing 42 via the motor 50, chain sprockets 46 and motor sprocket 48.

Accordingly, upon activation of the motor 50, the shaft of the motor (not illustrated) will rotate. This shaft extends into the housing and is secured to the motor sprocket 48 which will inherently rotate upon activation of the motor. The rotation of the motor sprocket 48 will cause the chain to travel horizontally and transversely. The transporting of the chain is assisted by the retractable chain sprockets 46. Due to the permanent affixment of the opposite ends of the chain to the first support member and due to the housing being secured to the second support member, the chain is able to travel laterally within the housing. The chain is anchored to the first support member to intrinsically cause the entire first frame section 12 to travel laterally with the chain 32.

Accordingly, it is seen that the housing 42, chain 32, sprockets 46 and 48, and motor 50 constitute the sliding means.

The tension of the chain can be adjusted, when necessary, via a chain adjusting bolt 52.

It is noted that the sprockets are illustrated in FIG. 1a via a window (illustrated, but not labeled). This window is for illustrative purposes only, and it is to be understood that in the final product the window will not be provided and that the components will be sealed and covered via the housing. The housing can include an opening means to open the housing and allow access interiorly. This interior access will enable the user to work on the components.

Securment of the first frame member 12 to the second frame 14 is accomplished by the connecting means 44. As shown, this connecting means 44 includes an optional support bar 54. The support bar 54 extends upwardly from the first end of the housing 42. Coupled to this support bar 54 is a conventional hydraulic leveling cylinder 56 having a piston (illustrated, but not labeled). This hydraulic cylinder 56 extends downwardly from the support bar 54 and is secured to the second frame member 14. This leveling cylinder 56 enables the adjustment of the implements secured on the first support member. Accordingly, this conventional leveling cylinder 56 is used to tilt and pivot the first frame section 12. This tilting and pivoting of the first frame section 12 will cause the conventional farmers implements (i.e. toppers, sprayers, or the like) to be tilted as desired. Hence, it is seen that this first frame sections 12 includes the capability of moving not only transversely along a conventional tractor, but can also be tilted or pivoted as so desired.

Since the support bar is optional, the hydraulic cylinder can be secured directly to the first end of the housing via conventional connecting means, i.e. connectors and brackets.

The connecting means further includes an attaching bracket 57 located at a second and opposite end of the housing. This attaching bracket 57 is secured to the second frame member. Thereby, the cylinder and attaching bracket 57 will provide for the housing to be secured to the second frame member, yet will provide for the first frame member to be slidably mounted within the housing. Accordingly, the attaching bracket 57 in combination with the hydraulic cylinder 56 constitute the connecting means.

Figure 4:
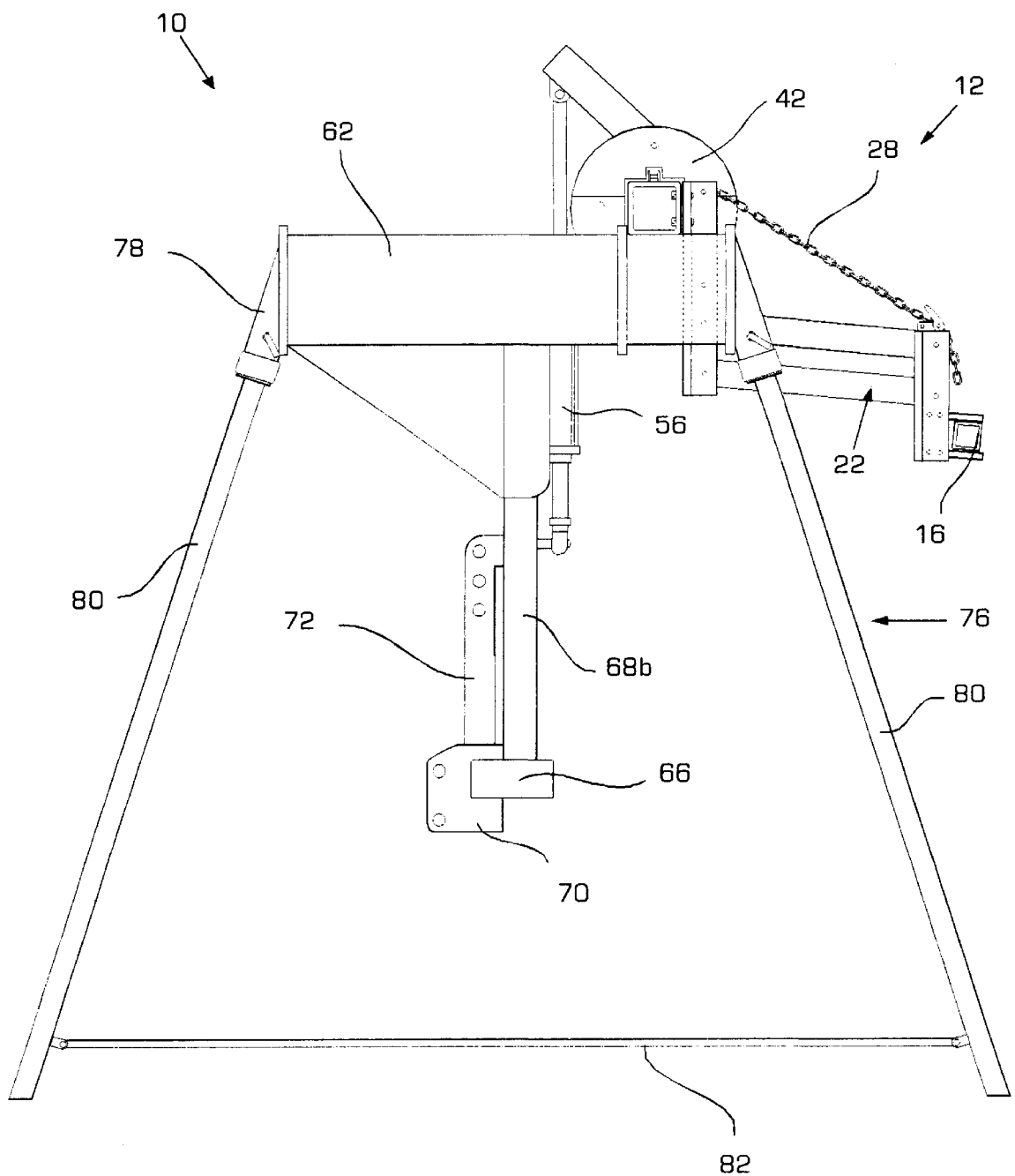
FIG. 4 is a side planar view of the second frame section of the multi-purpose tractor toolbar device of the present invention.

The second frame section 14 is used to maintain and counter balance the first frame section 12. This second frame section 14 is illustrated in further detail in FIGS. 2 through 4. As seen in these drawings, the second frame section 14 is simple in structure and design. This second frame section 14 has an upper support bar 58 having opposite ends 60a and 60b. Located on each end 60a and 60b are counter weight mounts 62. Attention is directed to the first end 60a, wherein this end may be larger than its opposite end. This is to provide added material for inherently adding to the weight of this end. Thereby, when the first frame member is extended outwardly and transversely (away from this end), this first end will counter balance the weight of the first frame member and the attached conventional farm implement devices.

Figure 2:
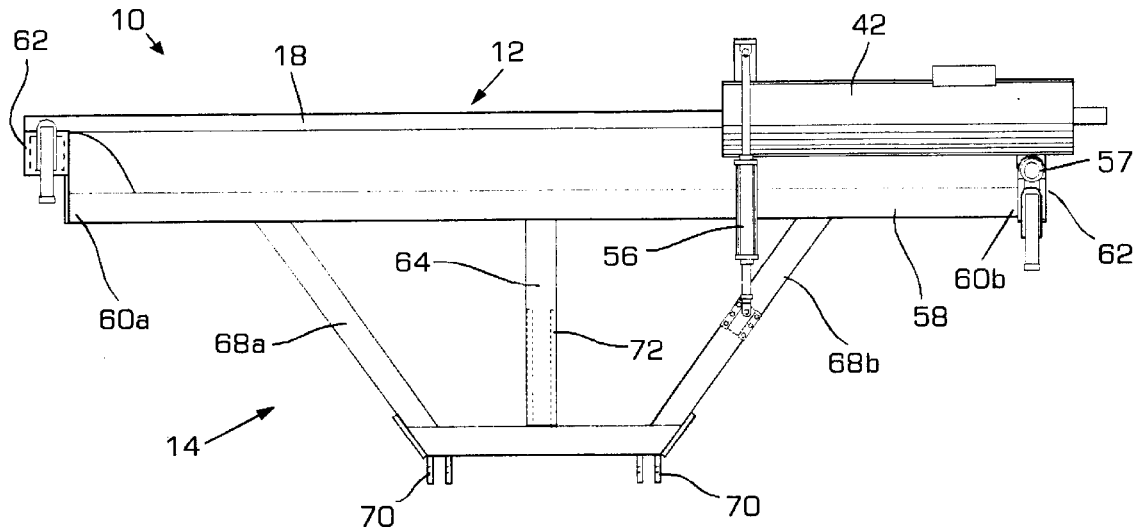
FIG. 2 is a back planar view of the second frame section of the multi-purpose tractor toolbar device of the present invention.

These counter weight mounts 62 can also be used to guide and maintain the conventional wiring and conduits necessary to operate the conventional farm implements, such as the conventional toppers, sprayers or the like. As such, the ends can have a plurality of configurations. As illustrated in FIGS. 2 and 3, the ends need not be the same and one can include a brace (located in proximity to first end 60a) while the opposite end can be rectangular in shape.

Extending downwardly, centrally and perpendicularly from the upper support bar 58 is a center support bar 64. This center support bar 64 couples a lower support bar 66 to the upper support bar 58. The lower support bar 66 is typically shorter in length than the upper support bar 58. For structural integrity for the second frame section, a first angular support bar 68a and a second angular support bar 68b extend upwardly and angularly from the opposite ends of the lower support bar 66. These angular support bars 68a and 68b are coupled to the lower support bar 66 and the upper support bar 58.

For securing this first frame section to the conventional tractor, a conventional attaching means is utilized. This conventional attaching means includes lower hook-up receiving means 70 located at the opposite ends of the lower support bar 66. The conventional attaching means further includes upper hook-up receiving means 72 located centrally on the center support bar 64. This will allow for the second frame section 14 to be removably secured to a conventional tractor device. The hook-up receiving means are coupled to the conventional three point hitch of a tractor. Once attached to the tractor, this second frame member is adapted to be raised or lowered via the three point hitch of the conventional tractor. Thereby, once attached, the multi-purpose tractor implement device of the present invention is able to be lifted or lowered via the three point hitch, tilted or pivoted via the hydraulic cylinder, or extended transversely or retracted transversely with respect to the back of the tractor via the sliding means.

Attached to the second angular support bar 68b is the hydraulic cylinder 56. Attached to the upper support bar 58 is attaching bracket 57. The combination of the securement of the hydraulic cylinder and attaching bracket provides for the connecting means 44. The connecting means provides for the first frame section to be coupled to the second frame section.

Situated and removably secured between the center support bar 64 and one of the angular support bar 68a or 68b is a holding tank 74. This holding tank 74 is removably secured to the second support member 14. The holding tank merely snaps into place between the center support bar and one of the angular support bar via conventional holding clamps or can be removably secured via the use of brackets and screws (as illustrated in FIG. 3). Oil can be stored in this tank to provide for the tank to act as an oil reservoir. Should the conventional farm implements devices utilize more oil than the capability of the conventional tractor, this holding tank can provide the additional necessary amount to properly employ the toolbar device of the present invention and the conventional farm implement devices secured thereto.

For proper and convenient storage of the device, the multi-purpose tractor implement device 10 of the present invention includes a standing means 76. The standing means 76, as shown, comprises a pair of channels 78 located in each counter weight mount 62. Poles 80 are designed to be removably secured to each channel 78. A stabilizing bar 82 can be used for added stability of the standing means.

Each channel includes apertures (illustrated, but not labeled). Located on the top end of each pole is a through hole which is adapted to be aligned with the apertures of the channels. A cotter pin or the like can then be inserted into the apertures and through hole for enabling the pole to be secured within each channel.

To utilize the multi-purpose tractor implement device 10 of the present invention, the user merely selects the desired tool implement. The desired conventional farming implement is then secured onto the first support member 16 by the manufacturer of the conventional farming implement. Securement occurs on the first support member 16. Hydraulically controlled multi-pass topping cans (toppers) produced by Powell have been used to produce favorable results. Conventional sprayers have also been attached to produce favorable results.

Once the conventional tool implement has been attached, according to the instructions supplied by the manufacturer, the second frame section 14 of the multi-purpose tractor implement device 10 is secured to the conventional tractor via the conventional lower and upper hook-up receiving means, 70 and 72 respectively (three point hitch).

Once secured, the device is ready to use. The user can adjust the location of tool implement by the use of the sliding means 30. Accordingly, the user may adjust the location by transversely sliding the first frame section with respect to the second frame section. The user may also adjust the angular placement of the conventional farm implement device via the cylinder, while the height of the first frame section can be altered via the three point hitch. Thereby, producing a product with the capability of movement laterally, angularly and vertically.

The toolbar can be stored by way of the standing means. This will allow the tractor to be used for other purposes, while providing an efficient and adequate means of storage.

While the invention has been particularly shown and described with reference to an embodiment thereof, it will be understood by those skilled in the art that various changes in form and detail may be made without departing from the spirit and scope of the invention.

I claim:

1. A multi-purpose tractor toolbar device capable of being used in combination with a conventional tractor, said multi-purpose tractor toolbar device comprising:

a first frame section and a second frame section;

said second frame section is capable of being removably secured rearwardly and centrally on said conventional tractor;

said first frame section is slidably mounted to said second frame section via a sliding means;

said sliding means enables said first frame section to travel transversely from said conventional tractor and retract behind said conventional tractor;

said sliding means enables said first frame section to slide linearly, laterally and parallel with respect to said second frame;

a chain assembly being included in said sliding means for enabling linear and lateral movement;

a connecting means connects said sliding means to said second frame section; and a hook-up means adapted to attach to said second frame section to said conventional tractor.

2. A multi-purpose tractor toolbar device as in claim 1 wherein said sliding means enables said first frame section to extend across at least two rows of crop.

3. A multi-purpose tractor toolbar device as in claim 1 wherein said first frame section comprises a first support member and a second support member, said first support member is parallel to said second support member and said first support member maintains conventional farming implement devices.

4. A multi-purpose tractor toolbar device as in claim 3 wherein said first support member is located on a different and lower plane than said second support member.

5. A multi-purpose tractor toolbar device as in claim 3 wherein said first support member is coupled to said second support member via a linkage means.

6. A multi-purpose tractor toolbar device as in claim 1 wherein said sliding means includes a chain, a housing and a motor, said chain extends horizontally across said first frame section, said chain and said motor constitute said chain assembly, said housing surrounds and partially covers said first frame section, said housing is secured to said connecting means for enabling said first frame section to slide freely within said housing, said motor is coupled to said housing, said motor includes a sprocket, said sprocket engages said chain, upon activation of said motor, said sprocket will rotate and cause said chain to move laterally and will cause said first frame section to slide.

7. A multi-purpose tractor toolbar device as in claim 3 wherein said sliding means includes a chain, a housing and a motor, said chain extends horizontally across said second support member, said chain and said motor constitute said chain assembly, said housing surrounds and partially covers said second support member, said housing is secured to said connecting means for enabling said second support member to slide freely within said housing, said motor is coupled to said housing, said motor includes a sprocket, said sprocket engages said chain, upon activation of said motor, said sprocket will rotate and cause said chain to move laterally and will cause said first frame section to slide.

8. A multi-purpose tractor toolbar device as in claim 7 wherein said sprocket of said motor is sandwich between a pair of retractable chain sprockets, said pair of retractable chain sprockets engage said chain and assists in the transportation of said chain when said motor is activated.

9. A multi-purpose tractor toolbar device as in claim 6 wherein a tension of said chain can be adjusted via a chain adjusting bolt located on said first frame section.

10. A multi-purpose tractor toolbar device as in claim 7 wherein a tension of said chain can be adjusted via a chain adjusting bolt located on said second support member.

11. A multi-purpose tractor toolbar device as in claim 1 wherein a tilting means is coupled to said first frame section for enabling said first frame section to be tilted and pivoted to a desired location.

12. A multi-purpose tractor toolbar device as in claim 1 wherein said connecting means includes a hydraulic cylinder and an attaching bracket, said hydraulic cylinder and said attaching bracket are coupled to said sliding means and said second frame section, and said hydraulic cylinder enables said first frame section to be tilted and pivoted to a desired location.

13. A multi-purpose tractor toolbar device as in claim 7 wherein said connecting means includes a hydraulic cylinder and an attaching bracket, said hydraulic cylinder and said attaching bracket are coupled to said housing and said second frame section, and said hydraulic cylinder enables said first frame section to be tilted and pivoted to a desired location.

14. A multi-purpose tractor toolbar device as in claim 1 wherein said second frame section includes an upper support bar having opposite ends, located at each end are counter weight mounts for counter balancing said first frame member when said first frame member is extended perpendicularly from a back of said tractor device.

15. A multi-purpose tractor toolbar device as in claim 14 wherein said second frame section further includes a center support bar coupling said upper support bar to a lower support bar, said lower support bar includes a first end and a second end, extending from said first end to said upper support bar is a first angular bar, extending from said each end to said upper support bar is a second angular bar, said first angular bar is located oppositely from said second angular bar on said lower support bar and said upper support bar.

16. A multi-purpose tractor toolbar device as in claim 1 wherein removably secured to said second frame section is a holding tank.

17. A multi-purpose tractor toolbar device as in claim 1 wherein said second frame section includes a standing means for enabling said multi-purpose tractor toolbar device to stand freely once removed from said tractor.

18. A multi-purpose tractor toolbar device as in claim 15 wherein said hook-up means is secured to said center support bar and said first end and said second end of said lower support bar.

19. A multi-purpose tractor toolbar device as in claim 13 wherein said second frame section includes a standing means for enabling said multi-purpose tractor toolbar device to stand freely once removed from said tractor.

20. A multi-purpose tractor toolbar device as in claim 19 wherein removably secured to said second frame section is a holding tank.

* * * * *